US 12,298,954 B1

(12) United States Patent
Konakanchi et al.

(10) Patent No.: US 12,298,954 B1
(45) Date of Patent: May 13, 2025

(54) LEVERAGING FIXED DATA RELATIONSHIPS TO MAKE PREDICTIONS BASED ON HIERARCHICAL FREE-FORM PLANNING DATA

(71) Applicant: Oracle International Corporation, Redwood Shores, CA (US)

(72) Inventors: Venkata Konakanchi, Santa Clara, CA (US); Rajak Syyad, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/655,882

(22) Filed: May 6, 2024

(51) Int. Cl.
*G06F 16/22* (2019.01)
*G06F 16/23* (2019.01)
*G06F 16/2458* (2019.01)

(52) U.S. Cl.
CPC .......... *G06F 16/2246* (2019.01); *G06F 16/23* (2019.01); *G06F 16/2477* (2019.01)

(58) Field of Classification Search
CPC ...... G06F 16/2246; G06F 16/23; G06F 16/24; G06F 16/2477; G06F 16/25
See application file for complete search history.

(56) References Cited

U.S. PATENT DOCUMENTS

| | | | | |
|---|---|---|---|---|
| 10,997,556 B2 * | 5/2021 | Scott | ................... | G06Q 10/103 |
| 11,243,966 B1 * | 2/2022 | Wong | ................... | G06F 16/244 |
| 11,550,785 B2 * | 1/2023 | Hammerschmidt | ................... | G06F 16/2448 |
| 2010/0122218 A1 * | 5/2010 | Mahadevan | ........... | G06Q 10/06 715/764 |
| 2011/0022437 A1 * | 1/2011 | Mundy | ................... | G06Q 10/10 705/7.23 |
| 2011/0041089 A1 * | 2/2011 | Lam | ....................... | G06Q 10/06 715/771 |

(Continued)

OTHER PUBLICATIONS oracle.com, "Getting Started with Oracle Enterprise Performance Management Cloud for Administrators—FreeForm", docs.oracle.com/en/cloud/saas/enterprise-performance-management-common/cgsad/1_epm_cloud_overview_ff.html, May 6, 2024.

(Continued)

*Primary Examiner* — James E Richardson
(74) *Attorney, Agent, or Firm* — MUGHAL GAUDRY & FRANKLIN PC

(57) ABSTRACT

A computer system causes structured data to be stored in data structures of a database according to a database schema. The structured data includes static nodes and dynamic nodes, which are defined based on values of the static nodes. The system receives new data that is not referenced by the dynamic node(s), but a particular dynamic node may be redefined to depend on the new data. The system receives a request to make a prediction based on a fixed value for the particular dynamic node, and, in response to the request, generates a copy of a subset of the hierarchical data to store simulated data that results from the prediction. The particular dynamic node is used to generate a reverse formula and update the copy of the subset of data by assigning new values determined by the reverse formula. Other formulas may also be used to propagate data for the prediction, and the prediction is used to generate a visualization.

20 Claims, 7 Drawing Sheets

(56) References Cited

U.S. PATENT DOCUMENTS

2011/0295838 A1* 12/2011 Collins .............. G06F 16/2264
707/715
2019/0102447 A1* 4/2019 Ramaiyer ............. G06F 16/254

OTHER PUBLICATIONS oracle.com, "Oracle Fusion Cloud EPM-Administering FreeForm", docs.oracle.com/en/cloud/saas/freeform/freef/index.html, May 6, 2024.

* cited by examiner

FIG. 3A

Edit Member Properties: Account 302

304 | Name ▼ 306 | ▼ 308 | Sort 310 | Descendants ▼

304

Data Region 312

| Member Name | Parent Member | Formula | Formula Contribution | Reverse Propagation | Override | Actual |
|---|---|---|---|---|---|---|
| ▼ Account | | | | | | 205,000 |
| ▼ Acme-Accounts | Account | | | Proportional-To-Actual | | |
| ▼ North-America | Acme-Accounts | North-America + 1.2*Asia + 1.3*Africa+1.1* Europe | Addition | Proportional-To-Actual | | 201,000 |
| ▼ United-States | North-America | | Addition | Equal | | 180,000 |
| Western-US | United-States | | Addition | Equal | | 90,000 |
| Midwestern-US | United-States | | Addition | Equal | | 45,000 |
| Eastern-US | United-States | | Addition | Equal | | 27,000 |
| | | | | | | 28,000 |
| ▲ Canada | North-America | | | Proportional-To-Actual | | 10,000 |
| ▲ Asia | Acme-Accounts | | | Proportional-To-Actual | | 30,000 |
| ▲ Africa | Acme-Accounts | | | Proportional-To-Actual | | 28,000 |
| ▲ Europe | Acme-Accounts | | | Proportional-To-Actual | | 26,000 |
| ▲ Custom-Accounts | Account | | Addition | Proportional-To-Actual | | 4,000 |

Edit Member Properties: Account 302

| Member Name | Parent Member | Formula | Formula Contribution | Reverse Propagation | Override | Actual |
|---|---|---|---|---|---|---|
| ▼ Account | | | | | | 215,000 ~~295,000~~ |
| ▼ Acme-Accounts | Account | North-America + 1.2*Asia + 1.3*Africa+1.1* Europe | Addition | Proportional-To-Actual | | |
| ▼ North-America | Acme-Accounts | | Addition | Proportional-To-Actual | 110,000 | 211,000 ~~291,000~~ |
| ▼ United-States | North-America | | Addition | Equal | | 99,000 ~~149,000~~ |
| Western-US | United-States | | Addition | Equal | | 49,000 ~~45,000~~ |
| Midwestern-US | United-States | | Addition | Equal | | 30,000 ~~27,000~~ |
| Eastern-US | United-States | | Addition | Equal | | 31,000 ~~29,000~~ |
| ▶ Canada | North-America | | | Proportional-To-Actual | | 11,000 ~~10,000~~ |
| ▶ Asia | Acme-Accounts | | | Proportional-To-Actual | | 30,000 |
| ▶ Africa | Acme-Accounts | | | Proportional-To-Actual | | 28,000 |
| ▶ Europe | Acme-Accounts | | | Proportional-To-Actual | | 26,000 |
| ▶ Custom-Accounts | Account | | Addition | Proportional-To-Actual | | 4,000 |

Data Region 312

Name 306  ▼ 308  Sort 310  Descendants

304

LEVERAGING FIXED DATA RELATIONSHIPS TO MAKE PREDICTIONS BASED ON HIERARCHICAL FREE-FORM PLANNING DATA

BACKGROUND

Databases store data according to a schema, where expected relationships are preserved to improve insights and analysis that can be made on the stored data. Different data managers have different requirements, and there is no single schema that can accommodate all possible scenarios. For this reason, data managers have adapted to use subsets of a schema to meet as many needs as possible or to start from scratch building a new schema with new relationships to build insights and analysis from the ground up.

The process of building a new schema and new relationships, insights, and rules is onerous for a data manager that would like to immediately benefit from the data management system with minimal manual labor. However, the complexity and rigidness of existing data structures may prevent data managers from making effective use of relevant parts of the schema.

Beyond the structure of the dataset, insights and analysis can be baked into datasets via automated calculations and reports that operate on top of the dataset. As the automations and reports are built on top of an existing schema, rebuilding the schema may also prevent the data manager from taking advantage of the existing automations and reports. Currently, data managers are left with a decision to rebuild the full data structure including all of the structure's automations and insights or to live with the closest possible existing structure, automations, and insights.

BRIEF SUMMARY

In some embodiments, a computer system causes structured data to be stored in data structures of a database according to a database schema. The structured data includes static nodes and dynamic nodes, which are defined based on values of the static nodes. The system receives new data that is not referenced by the dynamic node(s), but a particular dynamic node may be redefined to depend on the new data. The system receives a request to make a prediction based on a fixed value for the particular dynamic node, and, in response to the request, generates a copy of a subset of the hierarchical data to store simulated data that results from the prediction. The particular dynamic node is used to generate a reverse formula and update the copy of the subset of data by assigning new values determined by the reverse formula. Other formulas may also be used to propagate data for the prediction, and the prediction is used to generate a visualization.

In one embodiment, a computer-implemented method includes receiving at least part of a dataset to be stored in a database. The at least part of the dataset comprises custom hierarchical data over one or more periods of time. The custom hierarchical data includes two or more nodes that were not referenced by a dynamic node in the database before receiving the at least part of the dataset. The computer-implemented method further includes receiving a particular user-defined formula that redefines the dynamic node based at least in part on the two or more nodes. A request is received to make a prediction for the dataset stored in the database at a future period of time that is beyond the one or more periods of time. The request is executed to make the prediction at least in part by generating a copy of a subset of hierarchical data in the database. The subset covers a particular period of time of the one or more periods of time. The copy includes a copy of the dynamic node and copies of the two or more nodes. Making the prediction further includes overriding the copy of the dynamic node to a fixed value that is different from a result of the particular user-defined formula if the particular user-defined formula were evaluated on the copies of the two or more nodes. Making the prediction further includes determining a reverse formula for the copies of the two or more nodes based at least in part on the fixed value and the particular user-defined formula. The reverse formula is evaluated to determine new values for the copies of the two or more nodes based at least in part on the reverse formula. The copy is updated by assigning the new values to the copies of the two or more nodes. The copy is stored in the database in association with the future period of time and used to generate a visualization that shows one or more of the new values.

In a further embodiment, the computer-implemented method further includes accessing a specification that identifies an order of node formulas to be applied when determining the reverse formula. Determining the reverse formula is performed before determining one or more values from one or more other formulas of one or more other dynamic nodes in the copy. At least one of the one or more values is based at least in part on at least one of the new values.

In the same or a different further embodiment, the computer-implemented method further includes indexing the reverse formula, and re-using the reverse formula as indexed for a new prediction for a new future period of time to determine additional new values for additional copies of nodes.

In the same or a different further embodiment, the at least part of the dataset comprises the custom hierarchical data that does not use existing hierarchical data structures in the database, and wherein the at least part of the dataset comprises a second subset of data that does use one or more existing hierarchical data structures. The one or more existing hierarchical data structures comprise one or more dynamic nodes defined using one or more existing formulas. The custom hierarchical data is connected to the second subset using one or more custom user-defined formulas. Executing the request to make the prediction includes determining another reverse formula for the one or more custom user-defined formulas.

In the same or a different further embodiment, the computer-implemented method further includes importing the at least part of the dataset from a file comprising a plurality of rows of data and, for each row of the plurality of rows defining a given node, an identity of a parent node if a parent node exists for the given node.

In various embodiments, the visualization is a report, dashboard, or chart that shows the one or more of the new values for the future period of time.

In the same or a different further embodiment, the request to make the prediction is a scheduled request for a recurring prediction. In this embodiment, executing the request to make the prediction occurs based on a time indicated in the scheduled request.

In the same or a different further embodiment, the reverse formula is further based at least in part on values of the two or more nodes in the subset of the hierarchical data.

In the same or a different further embodiment, the request to make the prediction specifies the fixed value for the dynamic node and one or more other constraints for the prediction, wherein determining the reverse formula is further based at least in part on the one or more other constraints.

In the same or a different further embodiment, the computer-implemented method further includes receiving a request to change a previous compression dimension for the database to a new compression dimension from the custom hierarchical data, and, in response to the request, deleting one or more indexes and relational data structures based on the previous compression dimension and creating one or more indexes and relational data structures based on the new compression dimension. At least one of the one or more indexes is used to generate the visualization that shows the one or more of the new values.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 3A illustrates a user interface showing nodes of a dataset along with actual values for the nodes and, if present, custom formulas or reverse propagation rules that define reverse formulas.

FIG. 3B illustrates a user interface showing a node of a dataset that has been overridden with a static value with data propagated according to formulas and a reverse formula defined by the reverse propagation rules.

DETAILED DESCRIPTION

Figure 1:
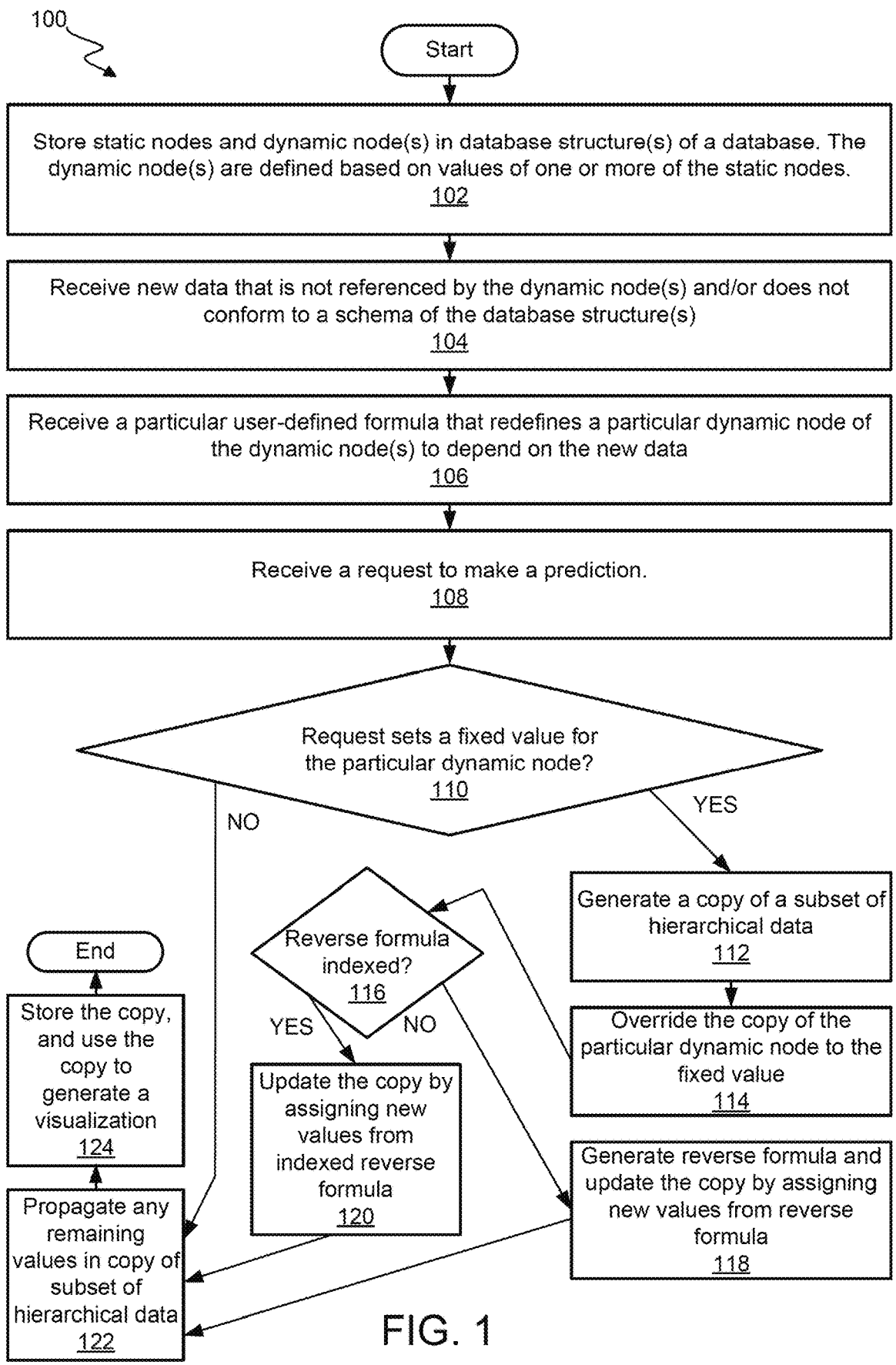
FIG. 1 illustrates a flow chart of an example process for making a prediction for a dataset using formulas and/or reverse formulas.

A method, system, and computer-readable media are provided for storing structured data in database structures that conform to a schema and receiving new data that does not conform to the existing database structures. One or more formulas of one or more dynamic nodes in the system may be redefined to reference the new data. The system may the process a request to make a prediction that fixes a value of a particular dynamic node that is otherwise defined based on a formula that is based on one or more other nodes. In response to the request, the system generates a copy of a subset of the hierarchical data to store simulated data that results from the prediction. The particular dynamic node is used to generate a reverse formula and update the copy of the subset of data by assigning new values determined by the reverse formula. Other formulas may also be used to propagate data for the prediction, and the prediction may be stored and used to generate a notification or other visualization, such as a visualization that is displayed on a user interface accessible by a client device via a browser. The techniques may be implemented on a local or cloud-based computer system that includes processors and a causes a display to show the user interface to a user.

A description of overriding dynamic nodes by propagating data using a reverse formula is provided in the following sections:

STORING HIERARCHICAL FREE-FORM PLANNING DATA
PROJECTING DATA VALUES
REVERSING A FORMULA FOR A STATIC OVERRIDE OF A DYNAMIC NODE
MAKING A PREDICTION FOR HIERARCHICAL FREE-FORM PLANNING DATA
EXPANDING FORMULAS AND REVERSE FORMULAS TO ACCOUNT FOR INFERRED RELATIONSHIPS
CHANGING THE COMPRESSION DIMENSION IN HIERARCHICAL FREE-FORM PLANNING DATA
DETERMINING PROJECTIONS USING MACHINE LEARNING AND FORWARD OR REVERSE PROPAGATION

USER INTERFACE FOR INTERACTING WITH HIERARCHICAL FREE-FORM PLANNING DATA COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Storing Hierarchical Free-Form Planning Data

Hierarchical data may be stored as a cube or a collection of dimensions, where each dimension has members arranged in a hierarchy. A "dimension" is a collection of related data items that are organized together and, for example, may share a common data structure, schema subset, or index, and may be related to other dimensions. Dimensions may have one or more attributes or fields that define values, or that define formulas for obtaining values. Non-limiting examples of dimensions may include account, department, business unit, and year, and each dimension may have multiple levels of members or nodes with information. As used herein, the terms "member," "node," and "row" are used interchangeably to refer to an individual item of data hierarchically positioned in a structured dataset. Each member may be a child of another member or a root member for the dimension, forming a tree of members for each dimension that can be represented as a drill-down hierarchy of members along each dimension.

A schema or hierarchical structure may be applied to the members, and different dimensions may support different sub-schemas of the database where data fitting within the dimension conforms to a certain data format and has certain well-defined relationships with other data in the dimension. Data fitting within certain parts of the schema or hierarchical structure may feed into or be bound to formulas, workflows, models or other logic managed by an application to use the data to efficiently determine values or accomplish tasks. For example, the weight of all units in a "units produced" portion of the hierarchy may be used in a first formula for determining individual shipping costs for each unit and a second formula for aggregating shipping costs across all units. Imported data that does not fit perfectly into the existing hierarchical structure or is not bound to existing formulas, workflows, or models, is not natively able to take advantage of this existing logic built to efficiently determine values or accomplish tasks.

In one embodiment, an application provides access to planning data for analysis and management. Data may be imported as hierarchical data to the application, and the hierarchical data may or may not match the schema or other hierarchical structure, known relationships, and existing formulas, workflows, models, or other logic for existing data structures managed by the application. The existing schema or other hierarchical structure, known relationships, and existing formulas, workflows, models, or other logic for existing data structures managed by the application are stored as an application container that defines functionality of the application. If the imported hierarchical data matches or is compatible with the known structure, relationships, and logic, the hierarchical data may take advantage of existing logical formulas that dynamically determine values, such as values of one data item based on values of other data items in the schema. If the hierarchical data partially matches the known structure, relationships, and logic, the hierarchical data may take partial advantage of existing formulas, to the extent values referenced by the formulas are known. The application may provide options to refine or modify existing formula definitions to reference data from different structures, having different relationships, or incorporating different logic, or to modify the number of data points taken into account by the logic, the weight of data points taken into account by the logic, and/or the way that data points are being combined in the logical formula, model, or workflow.

In a free-form planning application type, an application is created, and dimensionality is imported (some, none, or all). The dimensions that align with existing structures, relationships, and logic in the hierarchy may have pre-configured structure, relationships, and logical formulas, models, or workflows that use the values provided or statically defined to populate other dynamic nodes that depend on the static values. The formulas for dynamic nodes may or may not be present in imported data, and the dynamic nodes pre-existing in the free-form planning application may be attached or bound to the imported data or to a portion of the hierarchy in which the imported data fits to extend a base from which the dynamic node determines a result using a formula.

In one embodiment, uploaded data may fit into a structure expected by the formula such that the formula is automatically updated as the uploaded data is provided. For example, if a dynamic node exists where all children nodes are summed together, and the uploaded data adds or updates a child node of the dynamic node, the dynamic node may be updated automatically to account for the uploaded data.

In another embodiment, the uploaded data may cause new data structures to be created that are not dependent on existing data structures and on which the existing data structures do not depend. The free-form planning application may provide options to connect the uploaded data to certain existing dynamic nodes in the system by redefining the dynamic nodes to refer to the uploaded data. Alternatively or additionally, the free-form planning application may provide options to connect the uploaded data to certain existing static nodes such that dynamic nodes in the uploaded data may be defined to refer to existing static nodes that do conform with the existing data structure. In this manner, the uploaded data may be weaved into the existing data whether or not the uploaded data conforms to the existing data structures or matches any existing dimensions and their sub-schemas.

FIG. 1 illustrates a flow chart of an example process 100 for making a prediction for a dataset using formulas and/or reverse formulas. As shown, process 100 begins in block 102 to store static nodes and dynamic node(s) in database structure(s) of a database. Static nodes are, by default, defined by value, and dynamic nodes are, by default, defined by a formula that references one or more static nodes. Process 100 continues in block 104 to receive new data that is not referenced by the dynamic node(s) and/or does not conform to a schema of the database structure(s). The new data is said to be free-form data since the new data is uploaded without complying with data constraints of database structures storing the existing data in the database. In block 106, a free-form application receives a particular user-defined formula that redefines a particular dynamic node of the dynamic node(s) to depend on the new data. The free-form application may then, in block 108, receive requests to make predictions on the dataset and make the predictions based at least in part on the user-defined formula as shown in blocks 110-124 and explained in more detail herein.

Figure 2:
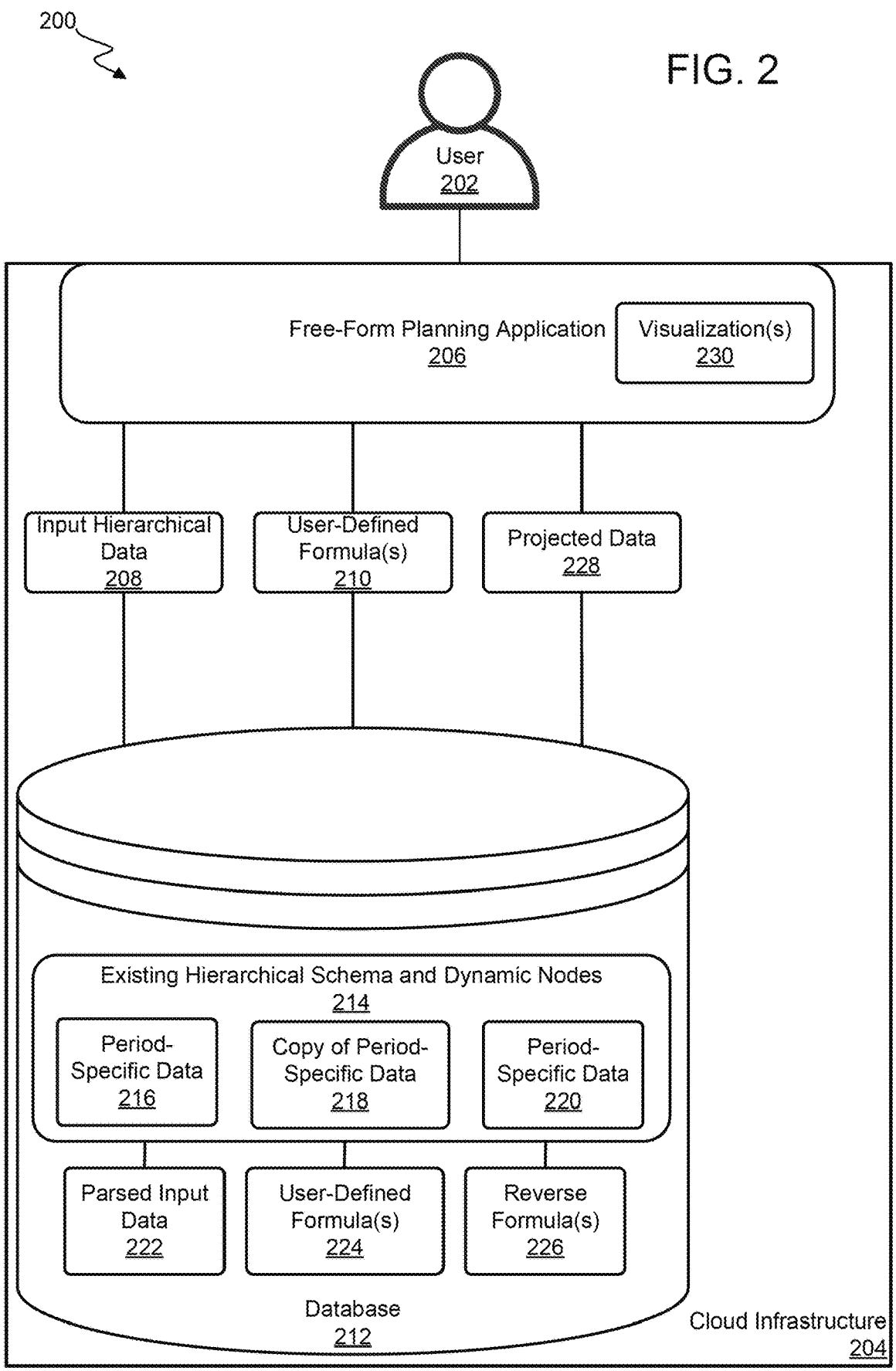
FIG. 2 illustrates a system diagram showing an example cloud infrastructure for making a prediction for a dataset using formulas and/or reverse formulas.

FIG. 2 illustrates a system diagram of a system 200 including an example cloud infrastructure 204 for making a prediction for a dataset using formulas and/or reverse formulas. The cloud infrastructure includes a free-form planning application 206 with which user 202 may interact to import hierarchical data 208, provide user-defined formula(s) 210, and receive projected data 228 or view visualization(s) 230. The free-form planning application sends input hierarchical data 208 and user-defined formula(s) 210 to database 212, where parsed input data 222 and user-defined formula(s) 224 may be stored in association with an existing hierarchical schema and dynamic nodes 214, which may include a plurality of existing dimensions. The parsed input data 222 may partially or wholly fit in some of the existing dimensions, or may not fit in any existing dimensions. For example, marked-up data may be received as input hierarchical data 208, and the marked-up data may be parsed to determine a data hierarchy for storage in relational database tables and indexes that represent the data hierarchy. User-defined formula(s) 224 may be provided with input hierarchical data 208 or separately from input hierarchical data 208, and user-defined formula(s) may relate to parsed input data 222 as stored in underlying database structures or period-specific data 216 or 220 as part of existing hierarchical schema and dynamic nodes 214. User-defined formula(s) 224 may also connect existing hierarchical schema and dynamic nodes 214 to parsed input data 222 as stored in underlying database structures, for example, by combining values from each data set into an aggregate value. The existing hierarchical schema and dynamic nodes may include data for specific periods, such as period-specific data 216 and 220. The free-form planning application may interact with database 212 to create one or more copies of period-specific data 218 for making a prediction or other projection, for example, using a what-if analysis.

The free-form planning application may make one or more projections of data in the copy of period-specific data to diverge the content of the copy 218 from the copy's source, such as period-specific data 216. The projections may override static and/or dynamic values to determine how those overrides impact other values. For example, the override may trigger updates in other values via user-defined formula(s). As another example, the override of a dynamic node may trigger updates in other values via reverse formula(s) that reconstruct the node values that originally contributed to the dynamic node to reach the new overridden total. The storage and application of reverse formula(s) may involve storing and applying reverse propagation rule(s) and/or custom reverse formulas. As a result of the data projection, projected data 228 is returned to free-form planning application 206 for inclusion in visualization(s) 230 to be presented to user 202.

Dimensions of data may be provided such that some portions of the data fit within some of the pre-existing dimensions and other portions of the data do not fit within the pre-existing dimensions. Some pre-existing dimensions may include dynamic nodes with dependencies, for example, that have bind values referencing other nodes in certain positions in the hierarchy or with certain node identities. The pre-existing dynamic dimension values can account for new data if the new data fits within the referenced positions. In other scenarios, pre-existing dynamic dimension values may not have dependencies satisfied by new data such that the pre-existing dynamic dimension values use bind values for which the new data is irrelevant or unrelated. The provided data may include new dynamic nodes that depend on or have bind values referencing other aspects of the provided data, and the new dynamic nodes may be used in place of existing dynamic nodes, in addition to the existing dynamic nodes, or otherwise with or without reference to or association with existing dynamic nodes. In this manner, pre-created artifacts by the free-form planning application may be combined with customer-provided artifacts to support planning and data management services.

In one example, imported data is used in combination with existing what-if models to predict one or more future dimension values. The imported data may include values that are detected in relevant portions of the hierarchy bound to the existing what-if model and used by the existing what-if model to project future data values in those relevant portions of the hierarchy. Data values may be adjusted for different what-if scenarios that allow the data manager to see how changes to certain data values lead to changes in other projected future data values, and/or to see how changes in projected future data values can be supported by changes to other certain data values. In other words, a net revenue may double in the future when unit production increases by 20%, and the 20% increase may be discovered using a what-if model to project a doubling of net revenue. Alternatively, the doubling of net revenue may be discovered using a what-if model to project a unit production increase of 20%.

In another embodiment, the imported data may not be connected to certain existing what-if models and may not satisfy data dependencies of the existing what-if models. In this embodiment, until the connection is made between the imported data and the what-if models, the what-if models may not be operable on the imported data or may not take the imported data into account when modeling scenarios.

Different entities may generate and manage data in different applications, and the data may be exported from the different applications and synchronously or asynchronously loaded into the free-form planning application. The synchronous or asynchronous import may be accomplished via an application programming interface (API), use a command-line tool, or manually upload a file via the user interface.

The imported data may be uploaded from a flat file or a backup file that includes structured information about the dimensions. For example, the flat file may be a CSV, XML, JSON, Excel®, or other spreadsheet logical file or an OTL physical file. The flat file may specify, for each row of data, a parent row of the data or an indication that the row is a root node, and one or more attributes of the row. Based on the flat file, an expandable and collapsible hierarchy may be generated to allow the parent nodes to be shown at a top-level and expanded to show child nodes at lower levels. The free-form planning application crawls down the spreadsheet to load the rows into memory to determine the root node, the root node's direct descendants, and the descendant's descendants, and so on until the full hierarchical tree(s) are constructed and can be traversed up to the root node and/or down to leaf nodes.

In one embodiment, data that is imported causes the free-form planning application to automatically detect which dimensions are used by the imported data, which may be free-form data that relies on no existing dimensions, partially free-form data that relies on some existing dimensions, or data that fully conforms to and fits within the existing schema, relationships, and logic. The free-form planning application may hide existing dimensions that are not used by the imported data and automatically connect the imported data to the existing dimensions that are used. The otherwise hidden existing dimensions may be unhidden and connected to the imported data so that pre-existing formulas and other dynamic dimension values may be automatically determined based on the imported data.

The free-form planning application allows data to be entered in varying levels of a structured hierarchy into the system, some parts of the hierarchy matching existing hierarchies in the system and other parts of the hierarchy not matching existing hierarchies in the system. The parts that match the existing hierarchy may or may not be connected to parts that do not match the existing hierarchy, and the parts that do not match the existing hierarchy may or may not be connected to parts that do match the existing hierarchy. If non-matching parts are connected to matching parts, the non-matching parts may contribute to existing formulas that account for values within a portion of the matching hierarchy for which the non-matching parts are associated. If the non-matching parts are not connected to matching parts, the non-matching parts may contribute to customized formulas, existing, imported, or otherwise user-specified that account for non-matching parts and optionally other matching or non-matching parts.

For example, an existing data structure may include the months of January, February, and March, with month-level data managed for each of the months. The months may be grouped together in a quarter. Formulas may be built into the system to aggregate month-level data for the different months into the quarter that contains the months to dynamically determine quarter-level data. Similarly, the quarters may be grouped together into a year, and the system may aggregate quarter-level data into the year containing the quarters to determine year-level data. Different users may manage data at different levels, such as hourly, daily, weekly, monthly, quarterly, half yearly, or yearly. Maintaining data at the hourly level does not require data to also be maintained at the daily, weekly, monthly, quarterly, half yearly, or yearly level, for example, because the data maintained hourly rolls up into these higher levels. Similarly, maintaining data at the monthly or quarterly level does not require data to also be maintained at the daily level unless actual daily data is also desired. The monthly or quarterly data can be used to approximate daily data based on portions of the data attributable to individual days within the month or quarter, with optional formulas for how the data is distributed over the month or quarter (e.g., evenly over business days, optionally excluding federal holidays).

Projecting Data Values

A user may define targets at different levels, hourly, daily, weekly, monthly, quarterly, half yearly, or yearly, such as an amount of units produced at the different levels or any other production or performance criteria at the different levels. The targets specified for one level may roll up or down into projected or predicted targets for other levels (days into weeks, weeks into months, months into quarters, etc. or quarters down to months, months down to weeks, weeks down to days, etc.). The projected or predicted targets may be overwritten with actual targets, and the higher-level and lower-level data may be adjusted based on the overwritten targets. The user may track performance based on any level where level-specific targets are determined based on specified targets, which may be specified for the same or a different level and propagated up or down to the performance-tracking level.

When free-form data is imported into the system, the system may or may not be configured to propagate the free-form data dimensions up or down when data is specified for one level and requested at another level. Propagating free-form data involves using knowledge about how the data relates to other data, and that knowledge is limited for data not associated with known definitions in the system that feed into known dimensions or using known formulas, for example, using bind values that reference other dimensions. For example, a unit produced may or may not be counted as an asset, depending on the scenario. Accordingly, an aggregating asset formula may or may not account for unit production. The upper levels may be unhidden, and the lower-level free-form data may be connected to the upper-level unhidden dimensions to expose existing formulas and allow the existing formulas to account for specific free-form or custom lower-level dimensions. The unhidden data may determine whether bottom-up or top-down propagation occurs between the levels, depending on what data has been provided and at what levels the data is being consumed. The unhidden dimension formulas, workflows, models, and other logic may be modified to account for imported data or otherwise customized based on differences between different implementations.

The formulas may take values from any dimension of the dataset into account, and propagating changes according to a prediction may involve re-calculating existing formulas that were previously calculated based on values prior to the changes made according to the prediction. For example, if a field value represents a gross revenue for a future quarter that is based on a sum of revenue values, and a proposed change adjusts a revenue prediction for a revenue value within the future quarter, the field value may be updated to represent an updated gross revenue for the future quarter that accounts for the proposed change based on a newly calculated sum. In another example, one or more formulas may include more complex rules that change the field value for some value ranges of fields in which the field value depends, but not change the field value for some other value ranges of fields in which the field value depends. In another example, one or more formulas may depend on a weighted combination of other field values, such as 20% of a first field value, 30% of a second field value, and 50% of a third field value. As the first, second, or third field values change, the formula may be recalculated to determine a new result that reflects the updated calculation.

In one embodiment, one or more rules for a specific formula, a group of formulas, or formulas in general may specify an order of operations that should occur when determining a result of the formula. For example, a sum of values may be ordered before a multiplication of other values or a division by other values. Order of operations may be specified using an ordered list of operations and/or by listing the operations in order from left to right using parenthesis to separate operations that should be separately performed first. In other embodiment, certain operations may be specified to always be first or last in formulas, or always before or after specific other operations in formulas. For example, a rule may specify that a currency conversion always occurs after a sum operation on currency items. The formula rules specified for a given set of imported data may be preserved for future data imports such as data imports that conform to the structure of the given set of imported data or imports that do not conform to the structure of the given set of imported data but may nevertheless apply the same rule defaults in terms of order of operations and proportional distribution.

In one embodiment, when making a projection on a dataset, the free-form planning application may copy data from a latest period of time and provide options to modify upper and/or lower levels of dimension values to adjust the prediction, for example, using a what-if model. For example, a month of April may be copied to project a month of May, and data values may be modified for the month of May to customize the prediction based on certain assumptions. Although the upper levels of the hierarchy may pre-exist in terms of formulas based on the lower levels, the upper levels may be specified as or overridden as fixed values for modeling, and the lower levels may be predicted based on historical proportions of contribution to the upper level. Although lower levels may pre-exist as fixed values, the lower levels may be modified based on their historical proportions of contribution to the upper level for modeling. The proportions may also be changed so that the lower, and/or lower level values may also be fixed so that proportions are adjusted based on a remaining non-fixed proportion that may account for changes in upper level or other lower level data. In this manner, formulas are preserved if possible. If it is not possible to preserve the formula (due to receiving a fixed value override, for example), proportions contributing to formulas are preserved if possible. If even the proportions are not possible to preserve (due to an override of a different proportion or fixed value, for example), the proportions are preserved as best as possible based on fixed values and historical proportions. This technique allows dynamic dimension values to be specified in static terms and static dimension values to be specified in dynamic terms to support flexible what-if modeling.

Along with providing an option to override a particular value at a particular level, the free-form planning application may present options to propagate values up, across, and/or down the hierarchy, with an option to override other values that were previously overwritten or to retain other values that were previously overwritten. If the option to override other values is selected, the free-form planning application propagates values up, across, and/or down (as selected or otherwise configured) the hierarchy, reverting previously overridden values and updating aggregate calculations and other formula results to account for the overridden particular value. If the option to preserve previously overwritten values is selected, the free-form planning application propagates values up, across, and/or down (as selected or otherwise configured) the hierarchy without reverting previously overridden values. Values that are available to be changed are adjusted based on historical proportions of contributions to formula results, even if the historical proportions of contributions cannot be perfectly preserved. For example, the user may select to fix an amount of 110 units of a particular unit type of production in the month of May, which is up 10% from the month of April. This change alone may lead to a net revenue increase of 40%. The user may also fix a net revenue increase of 100% and propagate results down from the net revenue increase. If the user opts not to preserve the fixed amount of 110 units of production, the free-form planning application may override the fixed amount based on a projected amount of units of production needed to accomplish the net revenue increase. For example, the amount may be changed to 120 units of production with other amounts also changing proportionally based on the fixed net revenue increase. In the example, an operation cost may be reduced by 10% as well as other proportional adjustments to increase the net revenue by 100%. The overall increase of 20% in units of production and decrease of 10% in operation cost may be propagated further down the dimensional tree, such that unit productions of different regions are adjusted, unit productions of different facilities in the different regions are adjusted, operation costs of different regions are adjusted, and operation costs of different facilities in the different regions are adjusted.

In another example, if the user opts to preserve the fixed amount of 110 units of production, the other amounts may be changed proportionally with respect to each other to make up for the net revenue increase that is not accounted for by the increase to 110 units of production. The propagation may result in changes in other unit types of production that account for a greater percentage of the change, such as by decreasing the operation cost by 15% rather than 10%. The overall increase of 10% in units of production and decrease of 15% in operation cost may be propagated further down the dimensional tree, such that unit productions of different regions are adjusted, unit productions of different facilities in different regions are adjusted, operation costs of different regions are adjusted, and operation costs of different facilities in different regions are adjusted.

Some lower-level adjustments, such as region-level adjustments or facility-level adjustments, may be made at proportions greater than or less than the specified proportion, to preserve data constraints. For example, units produced may be specified in whole numbers. In the example, if a first facility in a region produced 7 units last month and a second facility in the region produced 2 units last month, an increase of 10% may result in the first or the second facility increasing by 1 unit of production rather than the first facility increasing by 0.7 units and the second facility increasing by 0.2 units, which is not possible within the data constraints. The total resulting increase that preserves the data constraints is 10/9=11.1% rather than 10%, which is a minimum increase for that region to meet or approach the 10% increase in production. Another region may be projected to increase unit production by less than 10% based on the slight surplus in units from the given region.

Data propagation may follow specified rules for data constraints, which members are to be increased first if the results are uneven, and which aggregate amounts (such as "other costs") are allowed to fluctuate more and which aggregate amounts (such as "units produced") are allowed to fluctuate less in projected what-if scenarios.

Reversing a Formula for a Static Override of a Dynamic Node

In one embodiment, the free-form planning application propagates data to preserve reverse formulas even if the formulas are not expressed in terms of proportions or percentages. For example, if a particular value for a particular member at a particular level is initially the sum of the values of members at a lower level, changing the particular value of the particular member causes a proportional adjustment of the values of members at the lower level, preserving data constraints in the process. On the other hand, changing the value of one of the other members at the lower level, with results propagated up, may change the particular value of the particular member based on the newly determined sum of the lower-level members, which are now proportionally different with respect to each other.

In one embodiment, a static override of a dynamic value is evaluated by the free-form planning application to determine if all data types are consistent with allowed data types in the system. For example, if a portion of a hierarchy under a node is not allowed to contain static data, based on validation rules, then changing the node or a child or descendant of the node to contain static data may violate the validation rules. In one example, the validation rules may include default data types but allow nodes to be changed to include dynamic data and/or static data, at the discretion of the user. If dynamic data is chosen, an existing formula is used to determine a node value. If a static override is chosen, the dynamically determined data may be overwritten with static values even if the default type for the node is dynamic.

Referring back to FIG. 1, the free-form application may receive a request in block 108 to make a prediction, and the free-form application may make the prediction based at least in part on the user-defined formula as shown in blocks 110-124. In block 110, the free-form application determines whether the request sets a fixed value for a particular dynamic node. If yes, process 100 proceeds to block 112, where a copy of a subset of hierarchical data is generated based on the request. In block 114, the copy of the particular dynamic node is overridden with the fixed value from the request. Then, in block 116 as part of propagating results that may be impacted by the override, the free-form application determines whether a reverse formula is indexed. If not, in block 118, the free-form application generates a reverse formula and updates the copy by assigning new values determined from the reverse formula to propagate results that may be impacted by the override. The reverse formula determines how the fixed value override of the particular dynamic node is attributed to each node that previously contributed to the particular dynamic node. In other words, a relative attribution of each previously contributing node is determined such that the change to the particular dynamic node can be spread over the previously contributing nodes according to a value propagation plan or other reverse formula. Then, in block 122, the free-form application propagates any remaining values in the copy of the subset of hierarchical data. In block 124, the free-form application may store the copy of the subset of hierarchical data and use the copy to generate a visualization to be provided, for example, in response to the request.

If the request for a prediction does not set a fixed value for a dynamic node, as determined in block 110, process 100 may proceed directly to block 122, where requested results are propagated in a copy of a subset of the hierarchical data. The free-form application may use standard formulas that already exist in the database to perform the propagation, for example. Then, in block 124, the free-form application stores the copy of the subset of the hierarchical data and uses the copy to generate a visualization to be provided, for example, in response to the request.

If the reverse formula is indexed, as determined in block 116, process 100 may proceed directly to block 120, where the free-form application updates the copy of the subset of the hierarchical data by assigning new values determined from the indexed reverse formula. Then, in block 122, the free-form application propagates any remaining values in the copy of the subset of hierarchical data. In block 124, the free-form application may store the copy of the subset of hierarchical data and use the copy to generate a visualization to be provided, for example, in response to the request.

In various examples, inverse or otherwise reverse operations are applied in order to preserve formulas. For example, if a particular value of a particular member at a particular level is initially dynamically based on a logarithm of the value of another member at a lower level, changing the particular value of the particular member causes an exponential change to be applied to the value of the other member at the lower level, preserving data constraints in the process. By changing the value of the other member at the lower level exponentially, the logarithmic relationship between the other member and the particular member is preserved. On the other hand, changing the value of the other member at the lower level, with results propagated up, may change the particular value of the particular member based on the newly determined logarithm of the value of the lower-level member.

FIG. 3A illustrates a user interface 300 showing nodes of a dataset along with actual values for the nodes and, if present, custom formulas or reverse propagation rules that define reverse formulas. As shown, header 302, titled "Edit Member Properties: Account", includes a search bar 304 with a search field dropdown menu 306. Header 302 also includes a filter option 308 and a sort option 310, the sort option including a dropdown menu to select a field on which to sort. Data region 312 includes hierarchical data where each row or member other than the root node, Account, is listed with a parent member. The members may be expanded or contracted using the arrows to the left of each member name. Expanding a member shows the members underneath the member, and contracting the member hides the members underneath the member. As shown, Acme-Accounts, North-America, and United-States are expanded to show leaf nodes Western-US, Midwestern-US, and Eastern-US.

The formula column shows custom formulas, if any, for the members. As shown, the Acme-Accounts node is determined using the total for North-America (100,000) plus 1.2 times the total for Asia (1.2*30,000), plus 1.3 times the total for Africa (1.3*28,000), plus 1.1 times the total for Europe (1.1*26,000), for a total dynamically determined value of 201,000. Also as shown, the Account total of 205,000 includes Acme-Accounts and Custom-Accounts, which have both been labeled with "Addition" in the "Formula Contribution" field. Based on the formula contribution indication of Addition, even though there is no formula listed for Account, Acme-Accounts and Custom-Accounts may be added together to determine the actual for Account. Also as shown, the North-America total is derived from "Addition" contributions from United-States and Canada, and the United-States total is derived from "Addition" contributions from Western-US, Midwestern-US, and Eastern-US.

In order to preserve formulas, the inverse of a formula may be saved as metadata for the formula. FIG. 3B illustrates a user interface showing a node of a dataset that has been overridden with a static value with data propagated according to formulas and a reverse formula defined by the reverse propagation rules. FIG. 3B shows a North-America account that was previously defined as shown in FIG. 3A as a dynamic node whose value is a sum of the United-States and Canada members. As shown, an override value of 110,000 has been specified for the North-America member, which has automatically replaced the 100,000 with 110,000 in the Actual amount column. In one example, the override value may be provided as part of a what-if analysis that predicts a next month's net revenue based on a projected change in North-America net revenue. In other examples, the values could represent units produced, machine measurements collected from sensors, or any other recorded data. The 110,000 is then propagated down the tree using the reverse propagation rule, "Proportional-To-Actual" defined for the North-America member. In this example, United-States previously made up 90% of the amount for North-America, and Canada previously made up 10%. This proportion has been preserved by distributing 9,000 of the 10,000 projected increase (90%) to the United-States and 1,000 of the 10,000 projected increase (10%) to Canada, as shown. The extra 9,000 distributed to the United-States member in the projection is then propagated according to the reverse propagation rule specified for the United-States member, which is "Equal." In this example, since there are 3 leaf nodes under the United-States member, each leaf node is adjusted by 9,000/3 or 3,000, as shown.

As shown in FIG. 3B, the change is also propagated up the tree to the root node. In this example, the changes up the tree are propagated using the same formulas that were used before the change. For example, the Acme-Accounts total is increased by 10,000 because the formula for Acme-Accounts, "North-America+1.2*Asia+1.3*Africa+0.1*Europe," now evaluates to 211,000 in light of the override change to North-America. The Account member is also increased by 10,000 because the new Acme-Accounts total and the previous Custom-Accounts total combine with an "Addition" contribution to form the Account member's total.

In another example, for members A, B, and C, if member $A=\log_{10}(B)+\log_{10}(C)$ ("sum of the logs of B and C"), then member $C=10^4-B$. In this example, if A is adjusted to A', then the formula for A may be marked as inactive and the inverse formula for A may be marked as active. If B is fixed, C may be propagated based on $10^{A'}-B$. In a specific example where B is initially 1000 ($10^3$), C is initially 100 ($10^2$), and A is initially 5, adjusting A to 7 with B fixed results in $C'=10^7-1000=9,999,000$ or $10^{6.9999566}$ with the inverse formula of A being marked as the active source for C'.

If B is not fixed, in the sum of the logs of members example, A' causes an adjustment to each of B and C proportional to $10^{(A'-A)/(number\ of\ additive\ members)}$ in order to preserve the proportional accounting of B and C to the formula result of A. In the specific example where B is initially $10^3$, C is initially $10^2$, and A is initially 5, adjusting A to 7 with B and C variable results in an adjustment proportional to $10^{(A'-A)/(number\ of\ contributing\ members)}=10^{(7-5)/2}=10^1=10$. Accordingly, B' and C' can be adjusted by scaling by 10 to $10^3 \cdot 10=10^4$ and $10^2 \cdot 10=10^3$, respectively, such that $A'=10^7=\log_{10}(10^4)+\log_{10}(10^3)$.

As another example, if member $$A = \frac{B+C}{2}$$

("the average of B and C"), then C may be propagated based on C=2A−B. In this example, if A is adjusted to A', then the formula for A may be marked as inactive and the inverse formula for A may be marked as active. In a specific example where B is initially 800, C is initially 200, and A is initially 500, adjusting A to 700 with B fixed results in C'=2(700)−800=600 with the inverse formula of A being marked as the active source for C'.

If B is not fixed, in the average of members example, A' causes an adjustment to each of B and C in an amount of A'−A. In the specific example where B is initially 800, C is initially 200, and A is initially 500, adjusting A to 700 with B and C variable results in an adjustment proportional to 700−500=200. Accordingly, in one embodiment, B' and C' can be adjusted equally by adding 200, totaling 1000 and 400 respectively, such that $$A' = \frac{1000 + 400}{2} = 1400/2 = 700.$$

In another embodiment, rather than adjusting the members to preserve reverse formulas with equal increases among the members, the free-form planning application may provide an option to preserve reverse formulas and preserve a proportional accounting. In the previous example, B accounted for 400 out of the total 500 value of A, or 80% of A, and C accounted for 100 out of the total 500 value of A, or 20% of A. If A increases, the relative proportions may be added to B and C. In the example, A increases by 200, and 80% of the increase (160) may be scaled (times 2) and added to B and 20% of the increase (40) may be scaled (times 2) and added to C, resulting in B'=800+320=1120 and C'=200+80=280, such that $$A' = \frac{280 + 1120}{2} = 700.$$

Returning to the original example of $A=\log_{10}(B)+\log_{10}(C)$, B originally accounted for 1000 of the sum of B and C (1100), or 90.91%, and C originally accounted for 100 of the sum of B and C (1100), or 9.09%. Preserving the reverse formulas and preserving a proportional accounting resulted in increasing B to $10^4$ and C to $10^3$ such that B (10000) still accounted for 90.91% of the sum of B and C (11000). Preserving the reverse formulas with equal increases, on the other hand, would result in $7=\log_{10}(1000+x)+\log_{10}(100+x)=7=\log_{10}((1000+x)(100+x))=\log_{10}(x^2+1100x+100000)$. After exponentiating both sides, $10^7=x^2+1100x+100000$. Using the quadratic formula to solve the quadratic equation, $$x = \frac{-b \pm \sqrt{b^2 - 4ac}}{2a} \text{ where } a = 1, b = 1100 \text{ and } c = -9900000,$$

$$x = \frac{-1100 \pm \sqrt{1100^2 - 4(-9900000)}}{2} = 2644.14.$$

In this example where B and C are increased equally to preserve the formula without preserving the proportional accounting, B'=1000+2644.14=3644.14 and C'=100+2644.14=2744.14 such that $A'=\log_{10}(B')+\log_{10}(C') \rightarrow 7=\log_{10}(3644.14)+\log_{10}(2744.14)$.

In another example, the formula may account for weighted proportions of different values. Overriding the formula with a static value may cause the free form planning application to distribute, via a reverse formula, any change in value evenly or unevenly among the contributing dimensions. In a particular example, A=0.3B+0.3C+0.4D for formula A and original dimensions B, C, and D, where A is originally 1000 with B originally 1300, C originally 700, and D originally 1000. Modifying A to a static value of 1200 in a what-if scenario may, in one example, cause B, C, and D to change equally to account for the difference between the prior value and the updated static value. For example, increasing B, C, and D each by 200 results in A=0.3 (1500)+0.3 (900)+0.4 (1200)=1200.

In another example, B, C, and D could be increased based on their relative values prior to the change. In the example, the A, B, and C sum to 3000 total value prior to the change and may be responsible for a portion of the change based on their relative values prior to the change. In this example, 0.3B" would be responsible for 43.33% (1300/3000) of the change or 86.67, 0.3C" would be responsible for 23.33% (700/3000) of the change or 46.67, and 0.4D" would be responsible for 33.33% (1000/3000) of the change or 66.67. The changes would then be determined as B"=86.67/

0.3=288.89, and C"=46.67/0.3=155.56, and D"=66.67/ 0.4=166.67 Then, new values of B', C', and D' may be determined based on the original values plus the change in values, where B'=B+B", C'=C+C", and D'=D+D", simplifying to B'=1300+288.89=1588.89, C'=C+C"=700+ 155.56=855.56, and D'=D+D"=1000+166.67=1166.67. This preserves A'=1200=0.3B'+0.3C'+0.4D'=476.67+256.67+ 466.67=1200.

In yet another example, B, C, and D could be increased based on their relative contributions prior to the change. In the example, the B makes up 39% of A's value (1300/1000- 0.3=390/1000=39%), C makes up 21% of A's value (700/ 1000*0.3=210/1000), and D makes up 40% of A's value (1000/1000*0.4=400/1000) prior to the change. In this example, 0.3B" would be responsible for 39% of the change or 78, 0.3C" would be responsible for 21% of the change or 42, and 0.4D" would be responsible for 40% of the change or 80. The changes would then be determined as B"=78/ 0.3=260, and C"=42/0.3=140, and D"=80/0.4=200. Then, new values of B', C', and D' may be determined based on the original values plus the change in values, where B'=B+B", C'=C+C", and D'=D+D", simplifying to B'=1300+ 260=1560, C'=C+C"=700+140=840, and D'=D+D"=1000+ 200=1200. This preserves A'=1200=0.3B'+0.3C'+ 0.4D'=468+252+480=1200.

Although various examples are provided herein of formulas and reverse formulas, the free-form planning application may accommodate any formula and reverse formula. In one embodiment, a reverse formula for a formula is pre-calculated based on a mapping of formulas to reverse formulas, and the reverse formula is activated when the formula-determined value is overridden by a static value. The activated reverse formula may then be propagated up, across, or down the hierarchy of nodes of a tree.

In some embodiments, reverse formulas feed into standard (forward) formulas in a what-if scenario. For example, a dynamic performance value such as widgets produced may be overridden for the month of April. The dynamic performance value may feed via a reverse formula into values for widget production at different facilities. The values populated via the reverse formula into the values for widget production at the different facilities may forward-feed via a formula into materials used and production costs at each of the facilities. The free-form application may maintain a propagation template for specifying which values populate first and which values should feed forward based on reverse-fed values. In one embodiment, a default propagation template automatically steps away from a statically overridden node one node at a time such that all forward and reverse fed values from the statically overridden node have been propagated before more distant propagations occur, step by step in steps away from the overridden node.

The reverse formulas and data propagation may occur on standardized data stored according to an existing schema or other hierarchical structure, known relationships, and existing formulas, workflows, models, or other logic for existing data structures managed by the application. The reverse formulas and data propagation may also occur for free-form data uploaded by a user into the free-form planning application without conforming to the existing schema or other hierarchical structure, known relationships, and/or existing formulas, workflows, models, or other logic for existing data structures. In this latter embodiment, the free-form planning application may determine the reverse formulas dynamically based on any values and/or formulas present in the free-form planning data that is uploaded. For any imported data that fits into standardized or existing structures, relationships, formulas, workflows, models, and/or other logic, the imported data may take advantage of reverse formulas that are stored between fields among the standardized structures without the free-form planning application needed to redetermine the reverse formulas and without the user needing to specify or verify relationships.

For any imported data that does not fit into the standardized or existing structures, relationships, formulas, workflows, models, and/or other logic, the imported data may be used to determine new reverse formulas based on reverse formula rules that may be specified by default and/or customized by the user. The reverse formula rules may specify an order of operations, how data should be distributed (e.g., evenly, proportionally based on total contribution to the formula value, or proportionally based on total value, etc.), any customized reverse formulas that are not merely the inverse of the formula with even or proportional distribution, and/or whether a static override should be allowed for a given field. The reverse formula rules specified for a given set of imported data may be preserved for future data imports such as data imports that conform to the structure of the given set of imported data or imports that do not conform to the structure of the given set of imported data but may nevertheless apply the same rule defaults in terms of order of operations and proportional distribution.

In one embodiment, existing and/or imported data may specify a formula contribution for a dimension that is a child of or otherwise feeds into another dimension. For example, a parent node may exist with multiple child nodes, and each child node may include a formula contribution of "addition" in terms of how the child's value feeds into the parent's value. A new child may be added also with the formula contribution of "addition," and all of the added child nodes may be summed together and included in the parent node even if the parent node did not initially reference the child nodes in a centralized formula. Similarly, other formula contributions may be specified from the data sources such as subtraction, where the value is subtracted from the higher-level total; average, where the values of the lower-levels marked with "average" are averaged together with each other before being included in any addition or subtraction; multiple, where the values of lower-levels are multiplied together; or divisor, where the totals determined for the level are divided by the child value. In this manner, formulas may be extensible and added onto by individual child nodes that are merged into the dataset. The reverse formulas may account for these formula contributions by constructing the formula based on any contributing nodes and determining the reverse formula based on how the formula contributions would be combined plus any optional rules specified for determining the reverse formulas.

In a what-if analysis, the propagated values are for fictitious or hypothetical scenarios where the user does not need to manually populate values for higher-level nodes or lower-level nodes from where the what-if values are being provided. The values may be propagated by the free-form planning application, and the user may drill into the higher-level nodes or lower-level nodes as desired without the manual effort of performing the propagation manually for each node. When propagating data away from a statically overridden dynamic node, the user may specify whether results are to be propagated equally or proportionally to other nodes that initially contributed to the formula that initially defined the dynamic node, whether the results are propagated up, down, or across the hierarchy, whether the propagated results should overwrite other manually specified values, how many nodes up or down the hierarchy to reach with propagation (e.g., all the way to the leaf nodes and/or root node, or a specified number of nodes up or down the tree), and/or a manually specified custom formula if desired separately from an automatically calculated reverse formula for propagating the values up, down, or across the hierarchy.

Any automatically calculated reverse formulas and/or manually specified custom formulas may be saved in the free-form application and re-used by the free-form application for other what-if analyses involving similar nodes or similar what-if scenarios. For example, a what-if scenario for a following month may be re-used each month without reconfiguring what formulas should be used for propagation and how data should be propagated for the what-if scenario.

In some embodiments, a fictitious tree is created to support a what-if scenario for a future timeframe, and a real tree may be created to store data for the actual scenario when the future timeframe arrives. The fictitious tree and the real tree may exist concurrently for comparison between the predicted and the actual performance. Each tree may exist in a data management system accessible to the free-form planning application as a separate slice of data. The free-form planning application may highlight certain values that were predicted most incorrectly during past predictions, and may display a confidence value for predicting those values in future predictions. The confidence value may be displayed concurrently with the predicted value to indicate a reliability of the prediction.

In one embodiment, a specification of one or more rules for a specific reverse formula, a group of reverse formulas, or reverse formulas in general may specify an order of operations that should occur when determining a result of the reverse formula. For example, a sum of values may be ordered before a multiplication of other values or a division by other values. Order of operations may be specified using an ordered list of operations and/or by listing the operations in order from left to right using parenthesis to separate operations that should be separately performed first. In other embodiment, certain operations may be specified to always be first or last in reverse formulas, or always before or after specific other operations in reverse formulas. For example, a rule may specify that a currency conversion always occurs after a sum operation on currency items. The reverse formula rules specified for a given set of imported data may be preserved for future data imports such as data imports that conform to the structure of the given set of imported data or imports that do not conform to the structure of the given set of imported data but may nevertheless apply the same rule defaults in terms of order of operations and proportional distribution. The reverse formula rules and/or the order of operations specified for the reverse formula rules may differ from the formula rules or may be the same.

In some embodiments, predictive slices of data are created for each iterative timeframe as time progresses. For example, predictive slices of data may be created for a next month based on a template for creating predictive slices for the next month. The template may include propagation rules specifying how to propagate the data up, across, and/or down the tree. As a new timeframe approaches, a new slice may be created to store a new prediction based on a current timeframe being completed or a past timeframe reported. For example, the new slice may initially be a copy of the most recent or current timeframe or a past timeframe.

In some embodiments, the free-form planning application may include policies for expiring predictive slices over time, such that stale predictive slices are moved to an archived folder or location or deleted after a certain period of time has passed. In this manner, the user may see fresh predictive slices without the burden of distinguishing between predictive and actual slices in the distant past.

Expanding Formulas and Reverse Formulas to Account for Inferred Relationships

In one embodiment, the user interface includes an option to expand existing formulas and/or reverse formulas to account for inferred relationships determined based on a machine learning model. The machine learning model may ingest values from the dataset to determine which values are historically related and to what extent. These relationships, even though not hard-coded in the data, may be preserved or attempted to be preserved after hard relationships have been accounted for. For example, when determining how to apply a reverse formula, the user may select a checkbox indicating that the free-form planning application should determine how to apply the reverse formula rather than or in addition to relying on rules from the user. In this embodiment, the free-form planning application may determine how a statically overridden field is historically related to other fields and adjust the other fields accordingly using a custom-defined reverse formula that is determined automatically based on the machine learning model. For example, the model may use Bayesian statistics, principal component analysis, or a correlation neural network to determine what fields are correlated and to what extent, and may then derive a formula to describe the historical relationship among correlated fields using, for example, a regression analysis.

Making a Prediction for Hierarchical Free-Form Planning Data

In various embodiments, predictions or projections are made based on a request received by the free-form planning application. The predictions or projections may fix a value and project other values based on the fixed value, using formulas and/or reverse formulas to propagate values. The request may relate to a dataset of custom hierarchical data, and at least a portion of the dataset may be copied to facilitate generating the projected data. The copied portion of the dataset may hold the projected data values as well as the formulas and reverse formulas that are used to propagate other projected data values based on projected data values. The formulas and/or reverse formulas may account for multiple other nodes, and the projections may be made for a different period of time than the period of time represented by the dataset. The copy of the portion of the dataset with the projected data values may be saved in association with a future period of time or another period of time for the projection.

The free-form planning application may include projected data values in one or more results to be provided in a user interface in response to the request, via a notification or email to be sent in response to the request, or to be saved and provided upon further analysis. The results may be stored as a separate slice in association with the constraints specified in the request for the projected values. For example, the separate slice may be stored in association with a future time frame and/or one or more fixed values that were included to override dynamic node values as part of the request. In a specific example, one slice may be a what-if scenario for an overridden dynamic node value of 100,000 units, and another slice may be a what-if scenario for an overridden dynamic node value of 120,000 units, for the same or a different time period.

In one embodiment, the request to make the prediction is a scheduled request for a recurring prediction. For example, the scheduled request may be made each day, week, month, quarter, or other time period, and the scheduled request may be processed as each new time period is reached. In this embodiment, executing the request to make the prediction or projection may include a new timeframe such as one that occurs immediately after an existing timeframe of data. The new timeframe may also take advantage of the existing timeframe of data by copying data from the existing timeframe before projecting values and making changes to the copied data.

Changing the Compression Dimension in Hierarchical Free-Form Planning Data

In one embodiment, a user of the free-form planning application may choose to change a compression dimension for the free-form planning data in the system or free-form planning data being imported into the system. A compression dimension may be set by default, to compress and index data in the database to optimize lookup along a particular dimension as the reference dimension. For example, an accounts dimension may be a default dimension of interest. In other examples, a project dimension, procurement dimension, or workforce dimension may be dimensions of interest. The data may be compressed and indexed such that each dimension of a plurality of dimensions of the data are indexed along a relationship with the compression dimension. The free-form planning application may change the compression dimension based on different reporting requirements, and the compression dimension may be used to support reporting, dashboarding, predictions, notifications, models, and data propagations for what-if analyses, based on indexes created for the compression dimension.

Determining Projections Using Machine Learning and Forward or Reverse Propagation In one embodiment, a machine learning model is used to make some projections or predictions in the data based on a prompt or other query in the request. The machine learning model may use supervised or unsupervised learning to detect trends, predict data labels, or project anomalies in the dataset. These supervised or unsupervised machine learning models may use the forward and/or reverse formulas in the dataset to project forward or reverse propagations of the data based on certain fixed value overrides determined by the machine learning model. For example, the user may request a what-if scenario that results in a 5% increase in the company's stock price. As the stock price is not perfectly predictable, a machine learning model may be used to detect characteristics of the dataset that are historically correlated with increases in the stock price by 5%, and the machine learning model may fix values in the projected data based on these detected historically correlated characteristics. The free-form planning application may then forward and/or reverse propagate data values based on the projections and provide resulting projected data in a response to the user, for example, via a visualization on a user interface or via a notification.

User Interface for Interacting with Hierarchical Free-Form Planning Data

In one embodiment, imported data is viewable in a user interface that allows hierarchy levels for lower-level dimensions along an upper-level dimension to be expanded to see any hierarchy levels below the expanded lower-level dimensions. For example, a net revenue dimension may be expanded to show lower-level dimensions that are used to determine the net revenue, such as gross revenue, production costs, advertising costs, fixed expenses, etc.

The imported data may be used to show existing hierarchical data, automatic analysis, calculations, determinations, warnings, reports, dashboards, charts, and predictions based on the hierarchical data, and used to make decisions that impact the predictions to adjust goals and expectations based on actual performance. The reports and dashboards may be used to analyze what-if analyses for current data sets or predicted future data sets, and the reports and dashboards may be re-used period to period as time progresses where new periods are counted as future periods of predicted data and previously future periods are transitioned to current periods of actual data.

For example, projected data may be used to show a report of actual data as the actual data exists for the current period and projected data as the data is expected to exist in a next period. The report may include different what-if scenarios, such as if production increases by a percentage (e.g., 10%), stays flat, or decreases by a percentage (e.g., 10%). The what-if scenarios may be used for analysis of the full potential impact of the different scenarios.

Computer System Architecture

Figure 4:
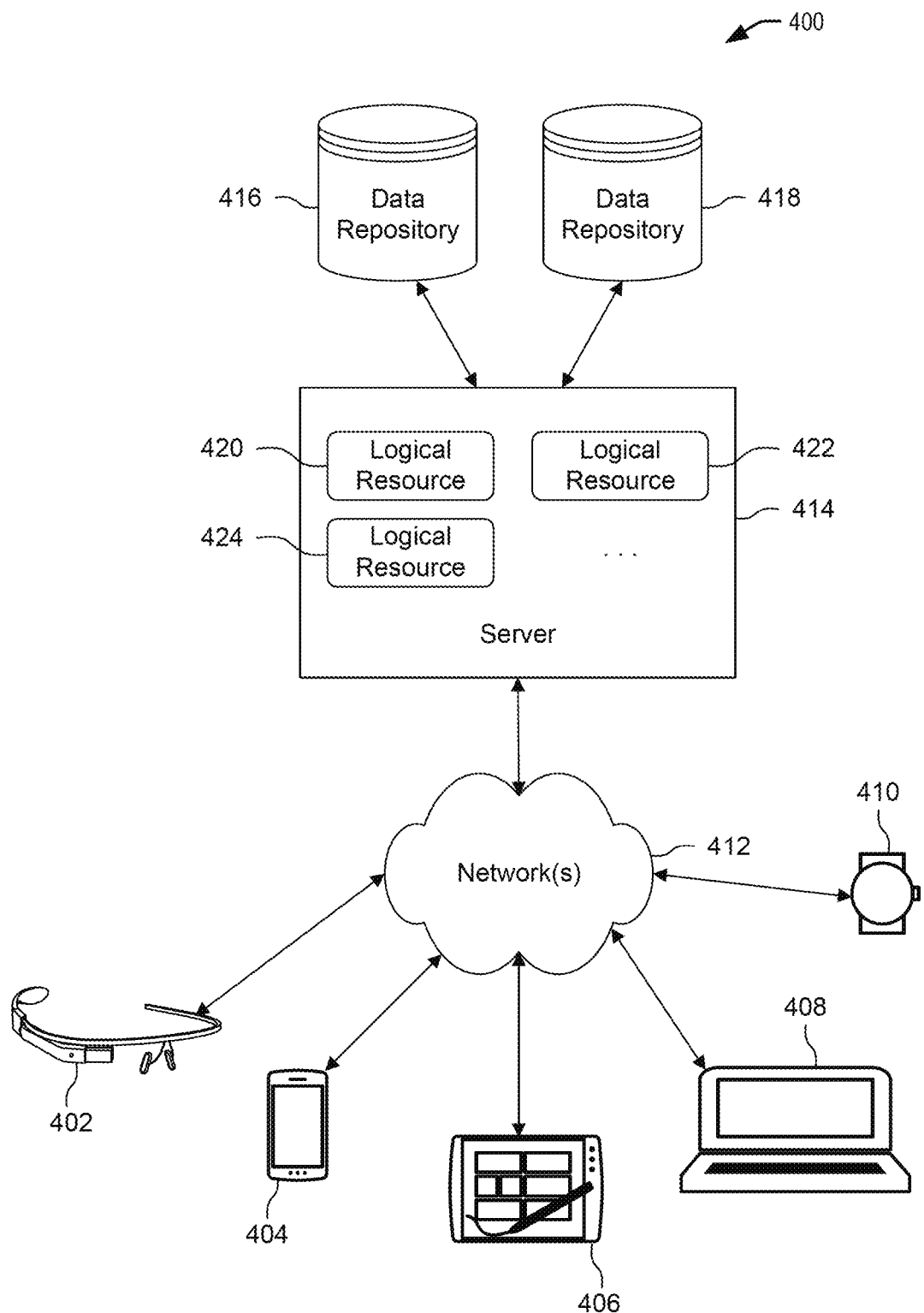
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410 coupled to a server 414 via one or more communication networks 412. Clients computing devices 402, 404, 406, 408, and/or 410 may be configured to execute one or more applications.

In various aspects, server 414 may be adapted to run one or more services or software applications that enable techniques for overriding dynamic nodes by propagating data using a reverse formula.

In certain aspects, server 414 may also provide other services or software applications that can include non-virtual and virtual environments. In some aspects, these services may be offered as web-based or cloud services, such as under a Software as a Service (SaaS) model to the users of client computing devices 402, 404, 406, 408, and/or 410. Users operating client computing devices 402, 404, 406, 408, and/or 410 may in turn utilize one or more client applications to interact with server 414 to utilize the services provided by these components.

In the configuration depicted in FIG. 4, server 414 may include one or more components 420, 422 and 424 that implement the functions performed by server 414. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, 408, and/or 410 for techniques for overriding dynamic nodes by propagating data using a reverse formula in accordance with the teachings of this disclosure. A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server.

In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM© (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store information for techniques for overriding dynamic nodes by propagating data using a reverse formula. Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 5:
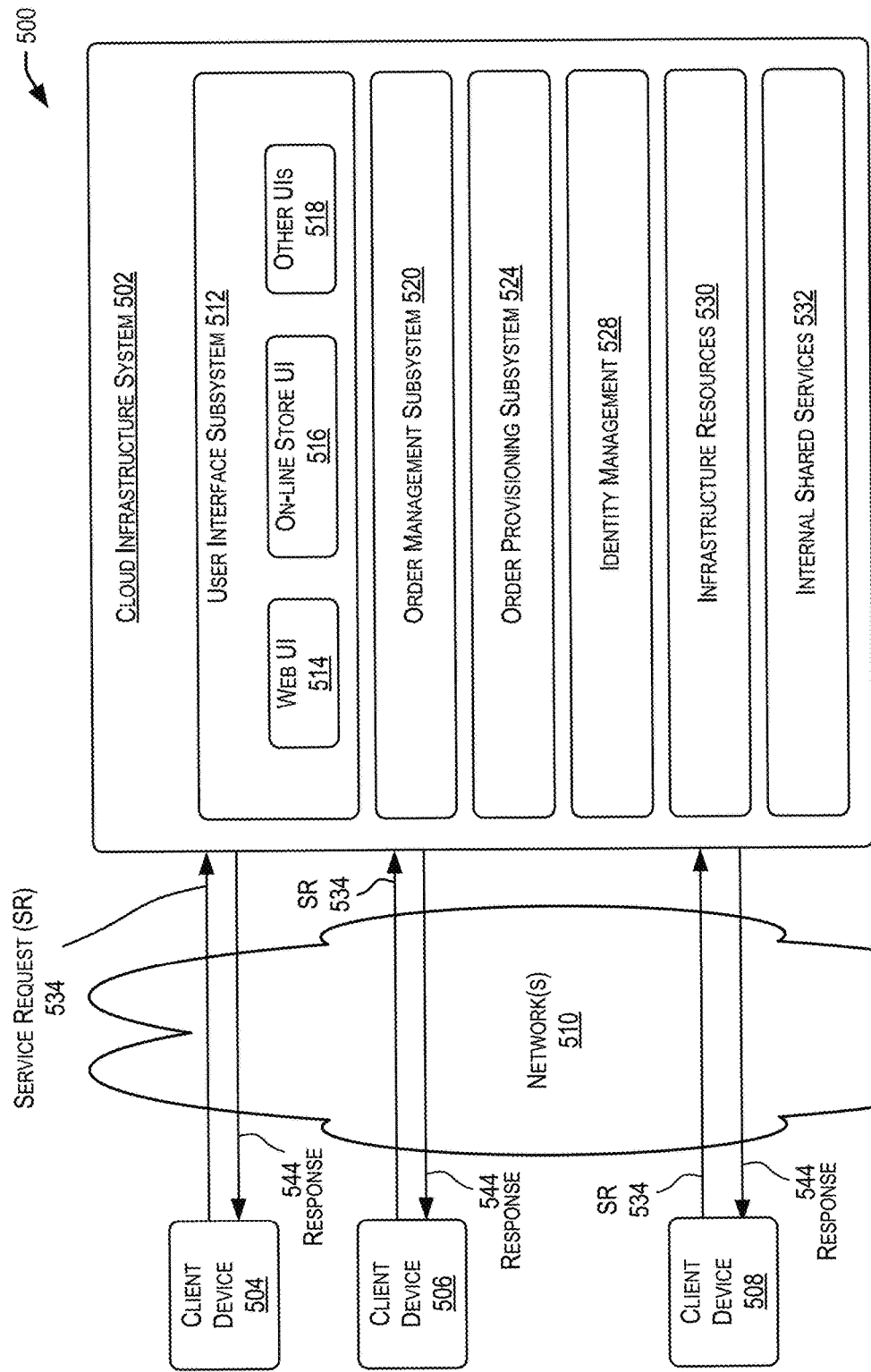
FIG. 5 is a simplified block diagram of one or more components of a system environment by which services provided by one or more components of an embodiment system may be offered as cloud services, in accordance with certain aspects.

FIG. 5 is a simplified block diagram of a cloud-based system environment in which dynamic nodes may be overridden by propagating data using a reverse formula, in accordance with certain aspects. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other aspects, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative aspects.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 502. Cloud infrastructure system 502 then performs processing to provide the services requested in the tenant's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public tenant, where the tenant can be an individual or an enterprise. In certain other aspects, under a private cloud model, cloud infrastructure system 502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502.

In some aspects, the processing performed by cloud infrastructure system 502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain aspects, to facilitate efficient provisioning of these resources for supporting the various cloud services provided by cloud infrastructure system 502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a tenant may, using a client device, request (service request 534) one or more services provided by cloud infrastructure system 502 using one or more of interfaces 514, 516, and 518. For example, a tenant may access the online store, browse cloud services offered by cloud infrastructure system 502, and place a subscription order for one or more services offered by cloud infrastructure system 502 that the tenant wishes to subscribe to. The service request may include information identifying the tenant and one or more services that the tenant desires to subscribe to.

In certain aspects, such as the embodiment depicted in FIG. 5, cloud infrastructure system 502 may comprise an order management subsystem (OMS) 520 that is configured to process the new order. As part of this processing, OMS 520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 502 may send a response or notification 544 to the requesting tenant to indicate when the requested service is now ready for use. In some instances, information (e.g., a link) may be sent to the tenant that enables the tenant to start using and availing the benefits of the requested services.

Cloud infrastructure system 502 may provide services to multiple tenants. For each tenant, cloud infrastructure system 502 is responsible for managing information related to one or more subscription orders received from the tenant, maintaining tenant data related to the orders, and providing the requested services to the tenant or clients of the tenant. Cloud infrastructure system 502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 502 may provide services to multiple tenants in parallel. Cloud infrastructure system 502 may store information for these tenants, including possibly proprietary information. In certain aspects, cloud infrastructure system 502 comprises an identity management subsystem (IMS) 528 that is configured to manage tenant's information and provide the separation of the managed information such that information related to one tenant is not accessible by another tenant. IMS 528 may be configured to provide various security-related services such as identity services, such as information access management, authentication and authorization services, services for managing tenant identities and roles and related capabilities, and the like.

Figure 6:
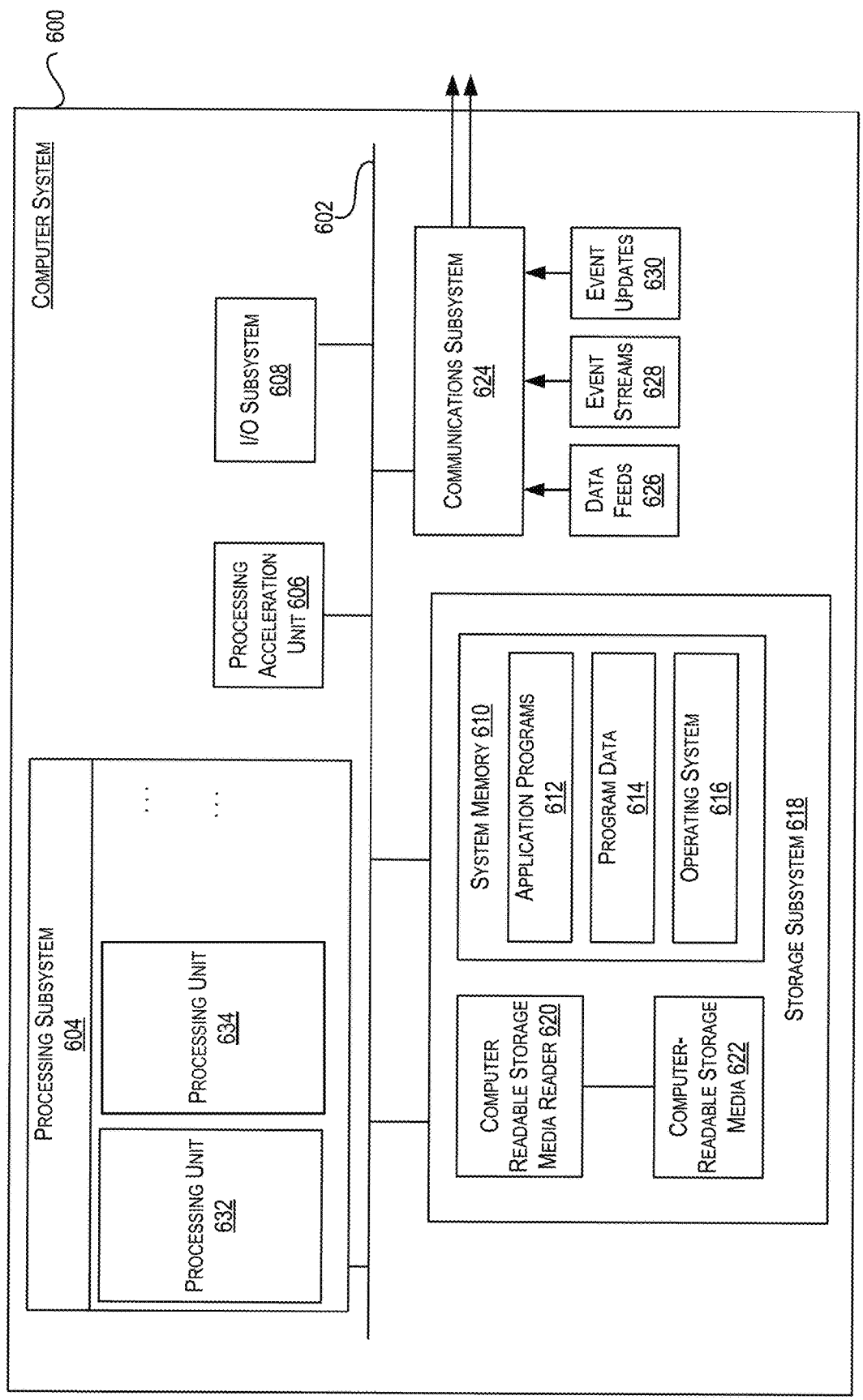
FIG. 6 illustrates an example computer system that may be used to implement certain aspects.

FIG. 6 illustrates an exemplary computer system 600 that may be used to implement certain aspects. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 624 can provide wired network connectivity (e.g., Ethernet) in addition to or instead of a wireless interface.

Communication subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
   receiving at least part of a dataset to be stored in a database, wherein the at least part of the dataset comprises custom hierarchical data over one or more periods of time, the custom hierarchical data including two or more nodes that were not referenced by a dynamic node in the database before receiving the at least part of the dataset;
   receiving a particular user-defined formula that redefines the dynamic node based at least in part on the two or more nodes;
   receiving a request to make a prediction for the dataset stored in the database at a future period of time that is beyond the one or more periods of time;
   executing the request to make the prediction for the dataset, wherein making the prediction comprises:
      generating a copy of a subset of hierarchical data in the database, wherein the subset covers a particular period of time of the one or more periods of time, wherein the copy includes a copy of the dynamic node and copies of the two or more nodes;
      overriding the copy of the dynamic node to a fixed value that is different from a result of the particular user-defined formula if the particular user-defined formula were evaluated on the copies of the two or more nodes;
      determining a reverse formula for the copies of the two or more nodes based at least in part on the fixed value and the particular user-defined formula;
      evaluating the reverse formula to determine new values for the copies of the two or more nodes based at least in part on the reverse formula;
      updating the copy by assigning the new values to the copies of the two or more nodes;
   storing the copy in the database in association with the future period of time; and
   using the stored copy to generate a visualization that shows one or more of the new values.

2. The computer-implemented method of claim 1, further comprising accessing a specification that identifies an order of node formulas to be applied when determining the reverse formula; wherein determining the reverse formula is performed before determining one or more values from one or more other formulas of one or more other dynamic nodes in the copy, wherein at least one of the one or more values is based at least in part on at least one of the new values.

3. The computer-implemented method of claim 1, further comprising indexing the reverse formula, and re-using the reverse formula as indexed for a new prediction for a new future period of time to determine additional new values for additional copies of nodes.

4. The computer-implemented method of claim 1, wherein the at least part of the dataset comprises the custom hierarchical data that does not use existing hierarchical data structures in the database, and wherein the at least part of the dataset comprises a second subset of data that does use one or more existing hierarchical data structures, wherein the one or more existing hierarchical data structures comprise one or more dynamic nodes defined using one or more existing formulas; wherein the custom hierarchical data is connected to the second subset using one or more custom user-defined formulas, and wherein executing the request to make the prediction comprises determining another reverse formula for the one or more custom user-defined formulas.

5. The computer-implemented method of claim 1, further comprising importing the at least part of the dataset from a file comprising a plurality of rows of data and, for each row of the plurality of rows defining a given node, an identity of a parent node if a parent node exists for the given node.

6. The computer-implemented method of claim 1, wherein the visualization is a report, dashboard, or chart that shows the one or more of the new values for the future period of time.

7. The computer-implemented method of claim 1, wherein the request to make the prediction is a scheduled request for a recurring prediction, wherein executing the request to make the prediction occurs based on a time indicated in the scheduled request.

8. The computer-implemented method of claim 1, wherein the reverse formula is further based at least in part on values of the two or more nodes in the subset of the hierarchical data.

9. The computer-implemented method of claim 1, wherein the request to make the prediction specifies the fixed value for the dynamic node and one or more other constraints for the prediction, wherein determining the reverse formula is further based at least in part on the one or more other constraints.

10. The computer-implemented method of claim 1, further comprising receiving a request to change a previous compression dimension for the database to a new compression dimension from the custom hierarchical data, and, in response to the request, deleting one or more indexes and relational data structures based on the previous compression dimension, and creating one or more indexes and relational data structures based on the new compression dimension; wherein at least one of the one or more indexes is used to generate the visualization that shows the one or more of the new values.

11. A computer-program product comprising one or more non-transitory machine-readable storage media, including stored instructions configured to cause a computing system to perform a set of actions including:
receiving at least part of a dataset to be stored in a database, wherein the at least part of the dataset comprises custom hierarchical data over one or more periods of time, the custom hierarchical data including two or more nodes that were not referenced by a dynamic node in the database before receiving the at least part of the dataset;
receiving a particular user-defined formula that redefines the dynamic node based at least in part on the two or more nodes;
receiving a request to make a prediction for the dataset stored in the database at a future period of time that is beyond the one or more periods of time;
executing the request to make the prediction for the dataset, wherein making the prediction comprises:
generating a copy of a subset of hierarchical data in the database, wherein the subset covers a particular period of time of the one or more periods of time, wherein the copy includes a copy of the dynamic node and copies of the two or more nodes;
overriding the copy of the dynamic node to a fixed value that is different from a result of the particular user-defined formula if the particular user-defined formula were evaluated on the copies of the two or more nodes;
determining a reverse formula for the copies of the two or more nodes based at least in part on the fixed value and the particular user-defined formula;
evaluating the reverse formula to determine new values for the copies of the two or more nodes based at least in part on the reverse formula;
updating the copy by assigning the new values to the copies of the two or more nodes;
storing the copy in the database in association with the future period of time; and
using the stored copy to generate a visualization that shows one or more of the new values.

12. The computer-program product of claim 11, wherein the set of actions further includes accessing a specification that identifies an order of node formulas to be applied when determining the reverse formula; wherein determining the reverse formula is performed before determining one or more values from one or more other formulas of one or more other dynamic nodes in the copy, wherein at least one of the one or more values is based at least in part on at least one of the new values.

13. The computer-program product of claim 11, wherein the set of actions further includes indexing the reverse formula, and re-using the reverse formula as indexed for a new prediction for a new future period of time to determine additional new values for additional copies of nodes.

14. The computer-program product of claim 11, wherein the at least part of the dataset comprises the custom hierarchical data that does not use existing hierarchical data structures in the database, and wherein the at least part of the dataset comprises a second subset of data that does use one or more existing hierarchical data structures, wherein the one or more existing hierarchical data structures comprise one or more dynamic nodes defined using one or more existing formulas; wherein the custom hierarchical data is connected to the second subset using one or more custom user-defined formulas, and wherein executing the request to make the prediction comprises determining another reverse formula for the one or more custom user-defined formulas.

15. The computer-program product of claim 11, wherein the set of actions further includes importing the at least part of the dataset from a file comprising a plurality of rows of data and, for each row of the plurality of rows defining a given node, an identity of a parent node if a parent node exists for the given node.

16. A system comprising:
one or more processors;
one or more non-transitory computer-readable media storing instructions, which, when executed by the system, cause the system to perform a set of actions including:
receiving at least part of a dataset to be stored in a database, wherein the at least part of the dataset comprises custom hierarchical data over one or more periods of time, the custom hierarchical data including two or more nodes that were not referenced by a dynamic node in the database before receiving the at least part of the dataset;
receiving a particular user-defined formula that redefines the dynamic node based at least in part on the two or more nodes;
receiving a request to make a prediction for the dataset stored in the database at a future period of time that is beyond the one or more periods of time;

executing the request to make the prediction for the dataset, wherein making the prediction comprises:

generating a copy of a subset of hierarchical data in the database, wherein the subset covers a particular period of time of the one or more periods of time, wherein the copy includes a copy of the dynamic node and copies of the two or more nodes;

overriding the copy of the dynamic node to a fixed value that is different from a result of the particular user-defined formula if the particular user-defined formula were evaluated on the copies of the two or more nodes;

determining a reverse formula for the copies of the two or more nodes based at least in part on the fixed value and the particular user-defined formula;

evaluating the reverse formula to determine new values for the copies of the two or more nodes based at least in part on the reverse formula;

updating the copy by assigning the new values to the copies of the two or more nodes;

storing the copy in the database in association with the future period of time; and using the stored copy to generate a visualization that shows one or more of the new values.

17. The system of claim 16, wherein the set of actions further includes accessing a specification that identifies an order of node formulas to be applied when determining the reverse formula; wherein determining the reverse formula is performed before determining one or more values from one or more other formulas of one or more other dynamic nodes in the copy, wherein at least one of the one or more values is based at least in part on at least one of the new values.

18. The system of claim 16, wherein the set of actions further includes indexing the reverse formula, and re-using the reverse formula as indexed for a new prediction for a new future period of time to determine additional new values for additional copies of nodes.

19. The system of claim 16, wherein the at least part of the dataset comprises the custom hierarchical data that does not use existing hierarchical data structures in the database, and wherein the at least part of the dataset comprises a second subset of data that does use one or more existing hierarchical data structures, wherein the one or more existing hierarchical data structures comprise one or more dynamic nodes defined using one or more existing formulas; wherein the custom hierarchical data is connected to the second subset using one or more custom user-defined formulas, and wherein executing the request to make the prediction comprises determining another reverse formula for the one or more custom user-defined formulas.

20. The system of claim 16, wherein the set of actions further includes importing the at least part of the dataset from a file comprising a plurality of rows of data and, for each row of the plurality of rows defining a given node, an identity of a parent node if a parent node exists for the given node.

* * * * *

UNITED STATES PATENT AND TRADEMARK OFFICE
CERTIFICATE OF CORRECTION

PATENT NO. : 12,298,954 B1
APPLICATION NO. : 18/655882
DATED : May 13, 2025
INVENTOR(S) : Konakanchi et al.

Page 1 of 1

It is certified that error appears in the above-identified patent and that said Letters Patent is hereby corrected as shown below:

In the Specification

In Column 15, Line 11, delete "+0.1*" and insert -- +1.1* --, therefor.

In Column 15, Line 36, delete "$^{(7-5)/2}=$" and insert -- $10^{(7-5)/2}=$ --, therefor.

In Column 23, Line 29, delete "Meta" and insert -- Meta® --, therefor.

In Column 24, Line 15, delete "IBM©" and insert -- IBM® --, therefor.

Signed and Sealed this
Twenty-second Day of July, 2025

Coke Morgan Stewart
*Acting Director of the United States Patent and Trademark Office*